United States Patent [19]
Ashline

[11] Patent Number: 6,032,607
[45] Date of Patent: Mar. 7, 2000

[54] EMERGENCY LOCATION SIGNALING DEVICE

[76] Inventor: Clifford E. Ashline, 5615 Crowley Blvd., Midland, Tex. 79707

[21] Appl. No.: 08/838,525

[22] Filed: Apr. 8, 1997

[51] Int. Cl.[7] ........................................................ B64B 1/50
[52] U.S. Cl. ........................................ 116/210; 116/DIG. 9
[58] Field of Search ................................ 116/210, DIG. 9

[56] References Cited

U.S. PATENT DOCUMENTS

| | | |
|---|---|---|
| 2,383,390 | 8/1945 | Jacobs ........................... 116/DIG. 9 X |
| 2,470,783 | 5/1949 | Mead . |
| 2,629,115 | 2/1953 | Hansen ................................ 116/210 X |
| 2,923,917 | 2/1960 | McPherson et al. . |
| 3,035,285 | 5/1962 | Squires, Jr. . |
| 3,123,842 | 3/1964 | Oeland, Jr. et al. . |
| 3,332,390 | 7/1967 | Ashline . |
| 3,341,871 | 9/1967 | Oliveau . |
| 3,676,779 | 7/1972 | Fauring et al. . |
| 3,893,202 | 7/1975 | Higgs et al. . |
| 4,102,296 | 7/1978 | Felix . |
| 4,295,438 | 10/1981 | Porter . |
| 4,416,433 | 11/1983 | Bellina ................................ 116/210 X |
| 4,433,638 | 2/1984 | Ashline ................................... 116/210 |

FOREIGN PATENT DOCUMENTS

| | | | |
|---|---|---|---|
| 2356485 | 5/1975 | Germany ................................ 116/210 |
| 1202315 | 8/1970 | United Kingdom .................... 116/210 |
| 1479266 | 7/1977 | United Kingdom . |

*Primary Examiner*—Hezron Williams
*Assistant Examiner*—Willie Morris Worth
*Attorney, Agent, or Firm*—Robert Blackman

[57] ABSTRACT

An aerial lift balloon and signaling components attached thereto are stored within a closure member held assembled with a breakaway housing to form a package storing an inflating device for the balloon. Removal of the closure member initiates inflation of the balloon and operation of the signaling components, while removal of an end cover of the package permits separation of the breakaway housing enabling the positioning of the inflating device by a flotation collar portion of the package for aerial launching of the balloon. A stroboscopic light suspended between the floatation collar and the aerial lift balloon provides enhanced visibility of the signal device.

7 Claims, 3 Drawing Sheets

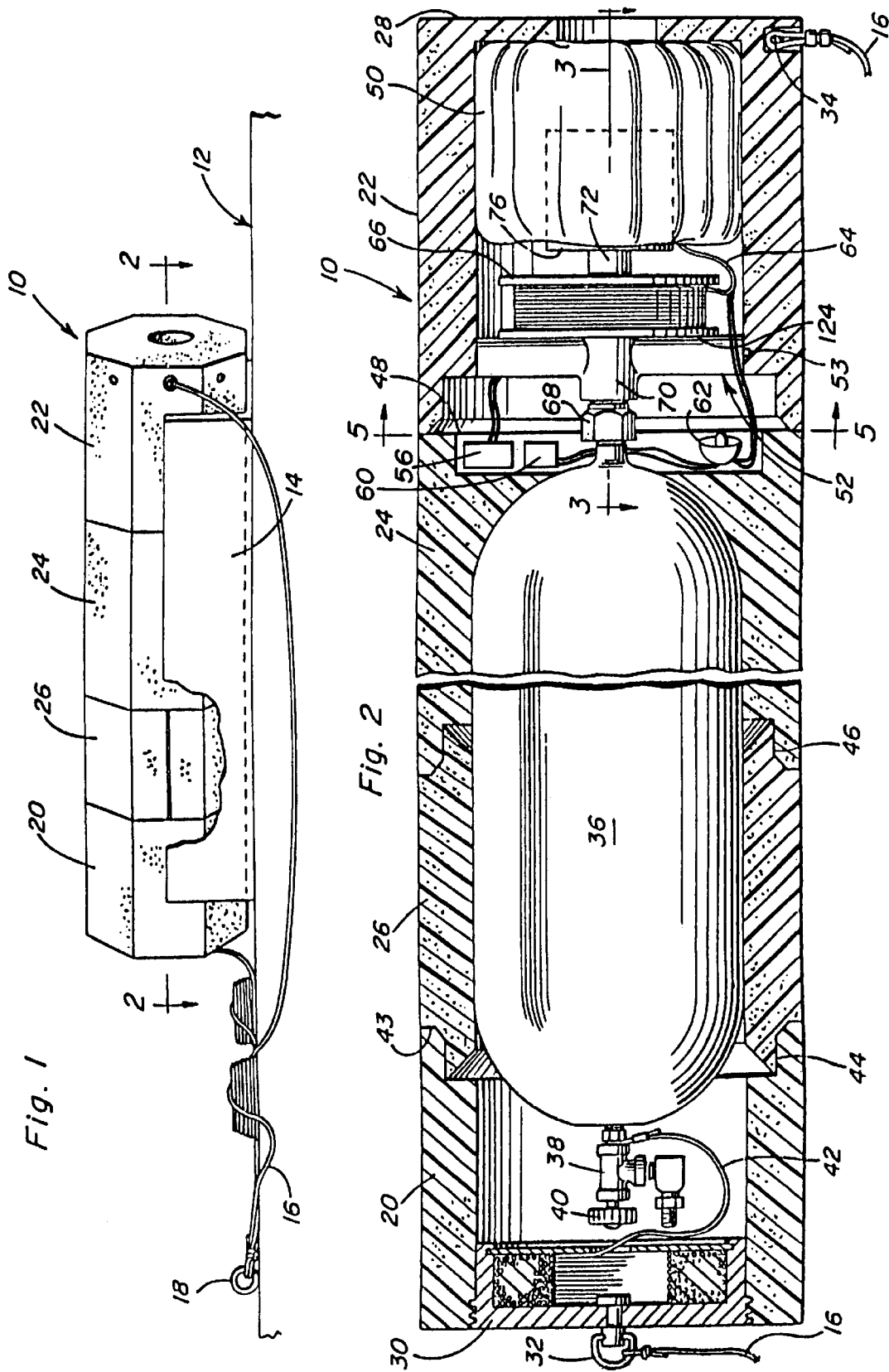

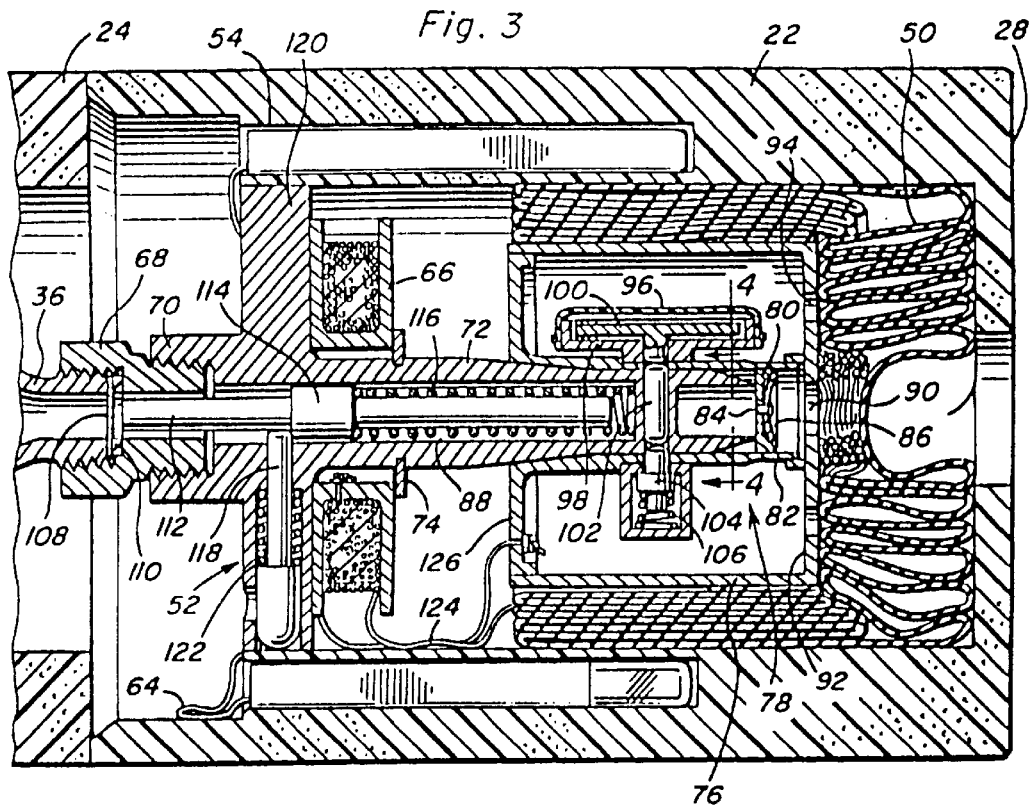
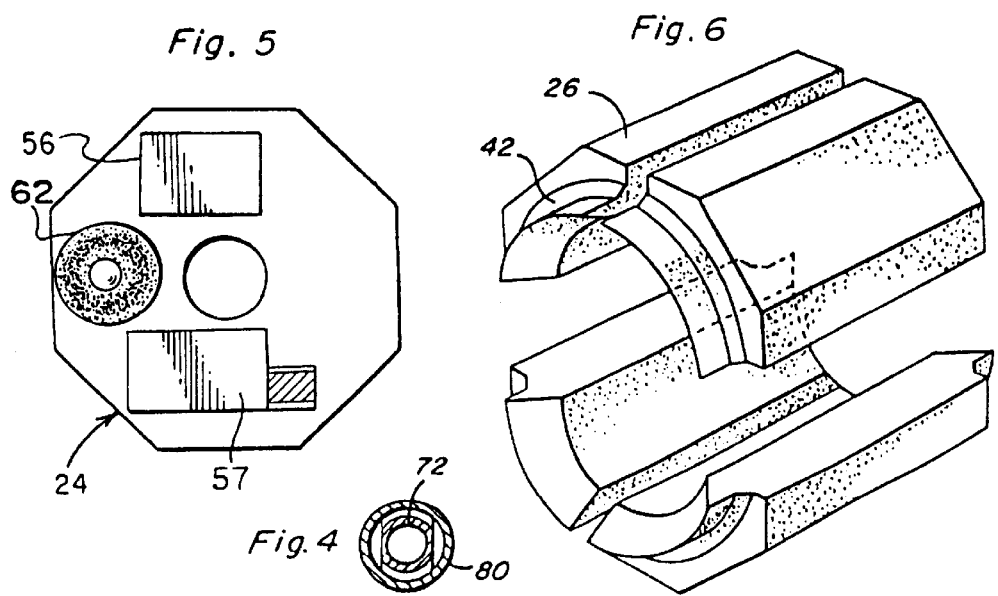

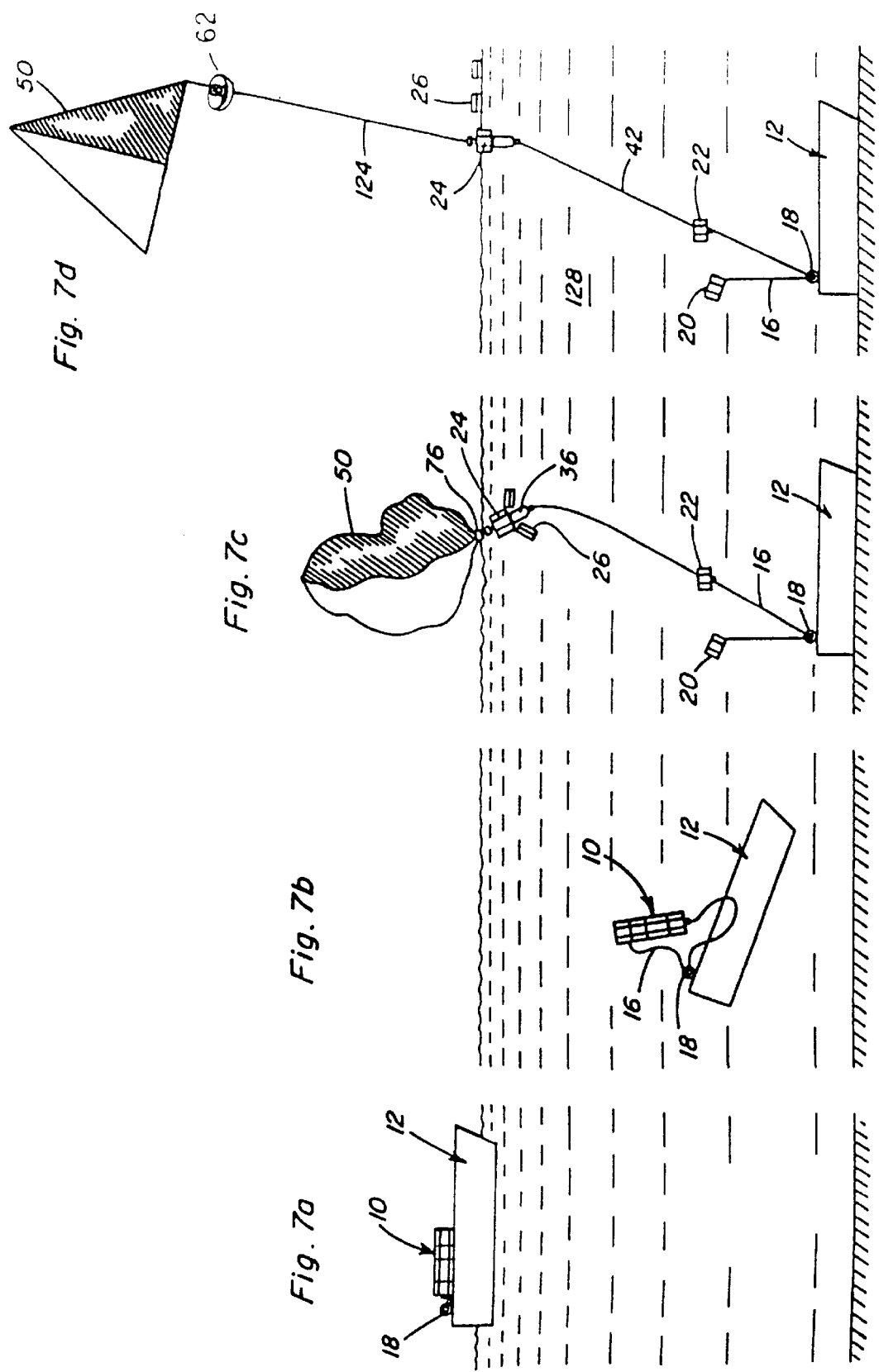

EMERGENCY LOCATION SIGNALING DEVICE

SUMMARY

BACKGROUND OF THE INVENTION

This invention relates to emergency location signaling devices of the type disclosed in my prior U.S. Pat. No. 4,433,638, incorporated herein by reference in its entirety, with respect to which the present invention is an improvement.

Location marking devices that are automatically released, launched and triggered into operation are well known as shown in my prior U.S. Pat. Nos. 3,253,573 and 3,332,390. The automatic release of a marker buoy anchored to a submerged craft, and from which an aerial balloon is launched, is shown in U.S. Pat. No. 2,470,783 to Mead. Also known are radio and light signaling components suspended from an inflated balloon anchored by a cable to its storage enclosure, as shown in U.S. Pat. No. 2,923,917 to McPherson. Other location signaling devices are shown in U.S. Pat. Nos. 2,821,725 and 4,102,296.

Such prior art location signaling arrangements often require special craft or vehicle mounting facilities and/or impact responsive release means that create installation problems and introduce a certain degree of unreliability such as unintended trigger. It is therefore an important object of the present invention to provide an improved, portable type of location signaling unit that may be carried by any type of vehicle or craft and triggered into operation either manually or automatically and providing visual and or aural signals which are suspended by but separate from the balloon.

SUMMARY OF THE INVENTION

In accordance with the present invention, a flotation collar is tightly mounted on a compressed gas inflating cylinder of a portable unit to floatingly support the cylinder in water for aerial launching of a lift balloon stored within a signal cover assembled in abutment with the flotation collar to hold a releasable trigger mechanism in a latched condition. Separable breakaway housing sections are held assembled between the flotation collar and an inspection cover at the opposite axial end of the unit housing package having a signal cover to form a launching guide assembly and protectively enclose various components including the inflation cylinder and associated inflating mechanism, the aerial balloon device and associated check valve and releasable coupling mechanism, and cable storage means for anchoring and interconnecting cable lines. Signaling components including a strobe light and batteries are also stored in the signal cover and are connected intermediate the balloon and the submerged craft by the interconnecting cable. Removal of the inspection cover exposes one end of the inflation cylinder for servicing, while removal of the signal cover triggers operation of the signaling components and initiates inflation of the balloon.

The signal cover may be automatically removed by buoyancy forces acting on the unit package in response to submerging of a craft on which the unit is carried with the end covers anchored by cable to the craft. Such removal of the covers causes separation of the breakaway housing section enabling the flotation collar to properly orientate the inflation cylinder at the water surface for aerial launching of the expanding balloon released upon removal of the signal cover. The floated inflation cylinder remains anchored by cable to the submerged craft while the balloon remains anchored to the cylinder with the operating signaling components suspended therefrom. The batteries which remain sealed inside the support collar 24 are not lifted by the aerial balloon but merely float to the surface reducing the weight of the signaling components aloft.

It is therefore an object of this invention to provide an improved automatic flotation release system with an improved construction to provide increased flight time, lower aerial flotation device volume, and provide a more compact system prior to and after deployment.

It is a further object of this invention to provide an improved arrangement of parts which will lower the weight of the device, avoid entanglement of cables during deployment, and enhance proper sequential deployment of the various components of the signaling system.

It is another object of this invention to provide an improved signaling device which has higher visibility during both day and night hours and provides for better electric separation of components.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DRAWING DESCRIPTION

BRIEF DESCRIPTION OF THE DRAWINGS

FIG. 1 is a side perspective view of an installed location signaling unit constructed in accordance with the present invention, with a portion of the installation broken away.

FIG. 2 is an enlarged partial side section view of the unit shown in FIG. 1, taken substantially through a plane indicated by section line 2—2 in FIG. 1.

FIG. 3 is an enlarged partial section view taken substantially through a plane indicated by section line 3—3 in FIG. 2.

FIG. 4 is a partial transverse section view taken substantially through plane indicated by section line 4—4 in FIG. 3.

FIG. 5 is a diagrammatic end view of the signal cover.

FIG. 6 is a perspective view of the disassembled breakaway housing section associated with the unit shown in FIGS. 1 and 2.

FIGS. 7a, 7b, 7c and 7d are simplified side elevation views showing sequential automatic operation of the location signaling unit in response to sinking of a marine craft on which the unit is carried.

DETAILED DESCRIPTION

DETAILED DESCRIPTION OF THE PREFERRED EMBODIMENT

Referring now to the drawings in detail, FIG. 1 illustrates a typical emergency location indicating unit constructed in accordance with the present invention, and generally referred to by reference numeral 10. The unit is shown carried on some vehicle or craft 12, by means of a holding rack 14 from which the unit may be removed for servicing. Further, the unit may be loosely anchored to the craft 12 by means of a cable 16 secured to some anchoring hardware 18.

The unit 10 has an outer package housing launching guide assembly, formed by axial end closure members 20 and 22, intermediate flotation positioning means in the form of a support collar 24 and a plurality of separable breakaway housing sections 26 held assembled between the end closure 20 and the flotation collar 24. In the illustrated embodiment, the housing assembly has an octagonal outer cross-section and forms a tubular enclosure between an end wall 28 of closure 22 and a cable storing plug member 30 of closure 20 as shown in FIG. 2. The anchoring cable 16 aforementioned is secured to the end closures 20 and 22 by means of any suitable fittings 32 and 34. The housing assembly is furthermore made of a floatable material. One skilled in the art would appreciate that although the housing is shown to be octagonal, a variety of shapes could be used, including but not limited to rectangular and irregular shapes.

With continued reference to FIG. 2, the end closure 20 constitutes an inspection cover which is frictionally engaged with the breakaway housing sections 26 to hold the same assembled and is manually removable therefrom to expose the axial end of a compressed helium gas cylinder 36 forming part of a gas inflating mechanism protectively enclosed within the housing assembly. The cylinder may be refilled with pressurized gas through a filler valve fitting 38 that is opened or closed by means of valve handle 40 upon removal of inspection cover member 20. One skilled in the art would appreciate that the use of aluminum tanks would require an alternate fill port in place of the bottom mounted fill port. To adapt the device to an aluminum tank, a circular or octagonal flange (not shown) fitted into the neck of the tank proximate the coupling 68 could be used. Attached to the outer periphery of the flange and communicating with the inner portion of the tank would be a filler spout closed by a valve member of the Shrader type typically used in automobile tires or a similar valve (not shown) accessible from the outside of the housing. The Shrader type valve is a highly efficient valve which is automatically opened and closed upon the insertion and removal of a mating filler tube from a helium source allowing communication of the pressurized helium source with the inner storage area of the tank and allowing very little helium to escape to the atmosphere during filling.

A cable 42 interconnects the cylinder 36 with the inspection cover member 20 and may be stored in the plug 30, for purposes to be explained hereinafter.

The breakaway housing sections 26 which may be four in number as more clearly seen in FIG. 6, have shouldered axial end portions 43 interfitted with the adjacent axial end portions 44 and 46 of the end cover 20 and positioning means or flotation collar 24 as shown in FIG. 2. When so interfitted, the sections 26 are held assembled to complete an enclosure for the cylinder. Removal of the inspection end cover 20 will therefore permit separation of the sections 26 from the cylinder 36 which remains tightly fitted within the flotation collar 24. The axial end 48 of collar 24 opposite recessed end portion 46, abuts the axial end of closure member 22 opposite the end wall 28. The closure member 22 constitutes a signal cover enclosing an inflatable aerial device or balloon 50 in a folded storage condition and releasable trigger means 52 for the inflating mechanism. Optionally a radio transmitter 60 can be provided as explained in U.S. Pat. No. 4,433,634 connected to the balloon by a separate suspension cable (not shown) which acts also as an antennae for the radio. The components 57, 58, 60 and 62 are held in a non-operating standby condition by the releasable trigger means 52 engaging a spring biased switch at 53 as long as the signal cover 22 is in engagement therewith as shown in FIGS. 2 and 5. Further, the signaling components are electrically interconnected through switch 53 for operation of the strobe light 62 and the optional radio transmitter 60 and by the energy stored in batteries 56 and 58. As shown in FIGS. 2 and 7d, cable portion 124 of the interconnecting cable 64 is connected intermediate strobe 62 and balloon 50. The strobe light 62 may have a clear cup or bowl like shape as shown in FIG. 7d to enhance its visibility.

A significant improvement to the current device over the device shown in U.S. Pat. No. 4,433,638 is the relocation of the signaling devices. The strobe light 62 has been relocated intermediate the balloon and the flotation collar 24. The batteries 56, 58 and control unit 57 have been place in the flotation collar. Electrical communication of the batteries is provided by appropriate, well-known cables or leads provided along cable 64. With the batteries supported by the flotation collar 24, the weight of the batteries is carried by the flotation collar 24 and is not suspended by the balloon 50, thus reducing the aloft weight of the strobe light and radio antenna and decreasing the necessary size of the balloon 50 to maintain the signaling devices aloft and increasing the duration of the flight of signaling components. The batteries 56 and 58 and control unit 57 have been appropriately sealed to allow continued operation of the strobe light 62 as the batteries must float on the surface of the water without water corrosion or contamination.

To adjust for the advance aloft time of the balloon 50, the strobe light 62 has been provided with additional adjustment to increase the battery life of the strobe light 62. A switch (not shown) provided on the control unit 57 (FIG. 5) determines the number of seconds between strobe light 62 flashes. The strobe light 62 flash frequency may be varied between 1 flash per second, 1 flash per two seconds, 1 flash per three seconds or 1 flash per four seconds to significantly increase the total operational time of the strobe light 62. Also the batteries are rechargeable and may be recharged in place.

At activation of unit, the balloon 50 raises cable portion 124, strobe light 62, and the remainder of cable portion 64 consecutively.

The cable 124 provides a tether line which maintains strobe light 62 at a sufficient distance above the surface level with strobe light 62 flashes directed towards the bottom of the balloon 50. A distance of 50 feet for cable 124 between the floating collar 24 and the strobe light 62 has been found sufficient to significantly enhance the visibility of the balloon 50 by enhancing the direct visibility of the strobe light 62 flashes reflected off the metallic surfaces of the balloon 50 at night. The balloon 50 may rise to an elevation of 350 feet and may be seen also over many more miles in the daytime.

Referring now to FIG. 3 in particular, the axial end of the cylinder 36 projecting from the flotation collar 24 is threadedly connected by a coupling 68 to axial projection 70 on one side of the releasable trigger device 52 having an elongated tubular support 72 extending from the other axial side on which a cable storage 66 is held axially assembled by a retainer disc 74. Fixedly mounted on the tubular support 72 in axially spaced relation to the cable storage 66 is a gas inlet housing 76 for the aerial device 50 enclosing an inflation valve mechanism generally referred to be reference numeral 78. The valve mechanism 78 includes a valve seat member 80 positioned within a tubular sleeve 82 positioning the housing 76 on the tubular support 72. The valve seat member 80 abuts one axial end of the tubular support 72 and is secured by a rivet 84 centrally to a flexible valve disc 86 biased to a valve closing position in peripheral engagement with the valve seat member. The valve disc 86 operates as a one-way check valve between a gas flow conduit formed by central bore 88 in the tubular support 72 and inlet opening 90 in the end wall 92 of housing 76 which is also formed with openings 94 establishing fluid communication between the interior of housing 76 and the interior of the expandable material of balloon 50 secured to the housing 76 and stored in the axial space between the end walls 92 and 28 of the housing 76 and the signal cover 22. A pressure sensing diaphragm 96 within the housing 76 is mounted on a piston housing 98 secured to the sleeve 82 for displacement of a release piston element 100 and a locking pin 102 extending transversely through the tubular support 72. The locking pin 102 is biased by a locking piston 104 and spring 106 to the locking position shown in FIG. 3. Displacement of locking pin 102 by the piston element 100 in response to pressurization of the balloon 50 releases or uncouples the sleeve 82 and balloon 50 from the tubular support 72.

In the storage condition of the balloon 50 as shown in FIG. 3, discharge of compressed gas from cylinder 36 into the bore 88 of the tubular support 72 is blocked by a disc 108 of the inflating mechanism held assembled by a washer 110 within coupling 68. A puncture pin 112 having a piston portion 114 is slidably disposed within the bore 88 under the bias of a puncture spring 116. The puncture pin 112 is held retracted against the bias of spring 116 by the releasable trigger device 52 which includes a retainer pin 118 slidably mounted within a transverse bore in an annular body 120 on which the signal cover 22 is supported. The retainer pin 118 is held in the position engaging the piston portion 114 of the puncture pin 112, as shown, by the signal cover. It will be apparent that upon removal of the signal cover 22 from the body 120 of the trigger device, retainer spring 122 will retract retainer pin 118 enabling spring 116 to project the puncture pin against disc 108 to rupture it and initiate inflation of the balloon 50 by discharge of pressurized gas into the bore 88 past the ruptured disc 108. Pressurization of the balloon 50 uncouples it from the tubular support 72 as aforementioned so that it is free to be launched into the atmosphere under the expanding action of the gas and its increasing air buoyancy. As the balloon 50 rises, cables 64 and 124 attached to the housing wall 126 are withdrawn from the cable storage 66 to which the cable 64 remains anchored.

The launching operation of the unit 10 is illustrated in FIGS. 7a, 7b, 7c and 7d. The unit 10 is carried by way of example, on a marine craft 12 to which it is anchored as shown in FIG. 7a. Assuming that the craft 12 sinks under some emergency situation as shown in FIG. 7b, the unit 10 being enclosed by flotation material begins to rise from the craft 12. The cable 16 anchored to craft 12 resists buoyancy forces exerted on the end covers 20 and 22 to pull them off the unit as the unit continues to rise under the buoyancy forces exerted on the flotation collar 24 as shown in FIG. 7c. Removal of the end cover 20, causes the breakaway housing sections 26 to separate from the cylinder 36, while removal of end cover 22 initiates operation of the signaling components 56–62 which remain connected by cable 64 to each other and to the aerial balloon device 50. The strobe light 62 is withdrawn from the flotation collar 24 as the balloon and inflating device rise above end cover 22 which remains anchored therebelow to the craft 12 by means of cable 16. The removal of the end cover 22 exposes the sealed signaling components and batteries to the environment. Because the strobe light 62 and transmitter 60 are connected to the balloon by the cable 64, these components are lifted with the balloon and suspended therefrom. With the end cover 22 removed, the strobe light 62 and transmitter 60 are free to move away from the floatation collar 24 and travel upward with the balloon 50. The batteries 56 however, remain on the floatation collar 24, held in place by known and suitable means such as adhesive, fasteners or other equivalent means. The balloon 50 and inflating device rise to the surface and are operatively orientated or positioned upright as shown in FIG. 7d by the flotation collar 24 for launching of the balloon 50 into the atmosphere as shown in FIG. 7d. Balloon 50 rises, pulls up cable line 64, strobe light 62, and cable line 64 emitting visual signals from balloon 50 and strobe light 62 in order to indicate the location of craft 12 submerged within the body of water therebelow.

It will be apparent that the unit 10 may be carried in other types of craft or vehicles, including aircraft. Further, the unit may be triggered into operation by manual removal of signal end cover 22 initiating inflation of the balloon 50 and operation of the signaling components to launch the location indicating balloon 50 into the atmosphere from any location to which the inflating cylinder 36 remain anchored by cables 42 and 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In an emergency locating unit having a floatable housing attachable to a vehicle having a first and second end, gas inflating and launching means and a lighter than air, inflatable aerial device within said housing, a positively buoyant removable closure attached at said first end of said housing; a trigger means activated upon removal of said removable closure during submersion of said floatable housing in water during the sinking of a vehicle attached to said floatable housing by floating away from said floatable housing and operating to trigger said gas inflating and launching means to inflate said inflatable aerial device and launch said inflated aerial device to an inflated, launched state; and said emergency locating unit further having an anchor means including a cable for securing to a vehicle for maintaining said aerial device at a predetermined distance above the vehicle, the improvement comprising a visual signaling means for producing visual signals and a battery for powering said visual signaling means and a cable electrically communicating said visual signaling means with said battery, said battery being housed in said floatable housing intermediate said visual signaling means and said anchor means when said aerial device is in said inflated, launched state.

2. The emergency locating unit according to claim 1, wherein said visual signaling means is a strobe light.

3. The emergency locating unit according to claim 2, wherein said strobe light is suspended a predetermined distance below the inflated aerial device whereby when said strobe light is operated, light from the strobe light is reflected off said inflated aerial device to increase the visibility of said emergency locating unit.

4. The emergency locating unit according to claim 3 wherein said strobe light is suspended 50 feet above said floatable housing.

5. The emergency locating unit according to claim 2, wherein said floatable housing is connected intermediate said strobe light and said anchoring means by said cable whereby when said unit is submerged beneath a water surface said floatable housing is adapted upon inflation of said aerial device to float to the surface of the water and maintain said battery at the surface level, and said inflatable aerial device is adapted to suspend said strobe light below said inflatable aerial device and above the surface level to enhance the visibility of said inflatable aerial device and said emergency locating unit in said inflated, launched state.

6. The emergency locating unit of claim 5 wherein said strobe light further includes a control means for adjusting the flash frequency rate.

7. The emergency locating unit according to claim 6, wherein said flash frequency rate is in the range of one flash per 1 to 4 seconds.

\* \* \* \* \*